G. F. HUMPHREY & H. MERRIN.
COOKING UTENSIL.
APPLICATION FILED DEC. 28, 1911.

1,056,547.

Patented Mar. 18, 1913.

2 SHEETS—SHEET 1.

Witnesses:
Marie H. Braun
Marie H. Lehr

Inventors:
George Frederick Humphrey & Harry Merrin
By L. H. Böhm, Att'y.

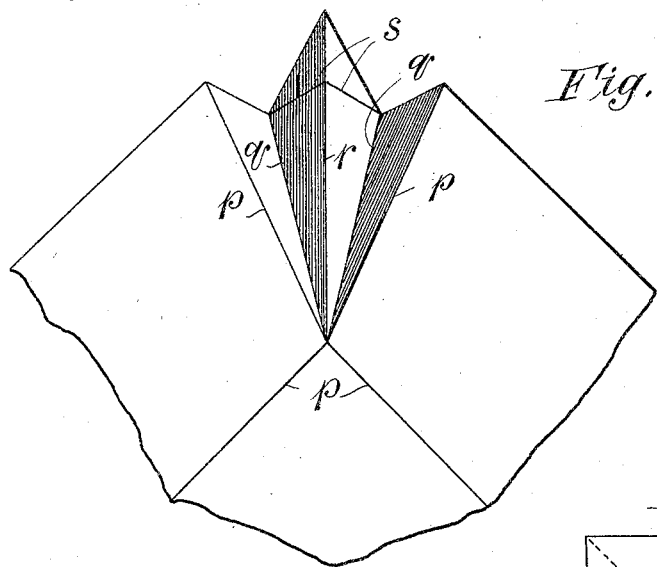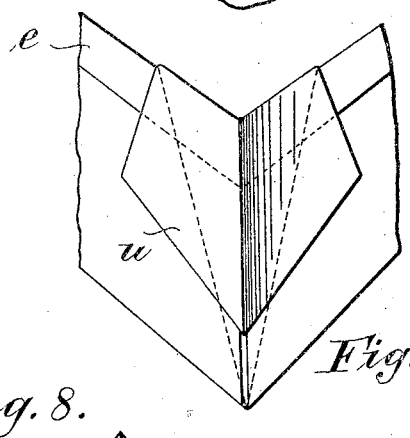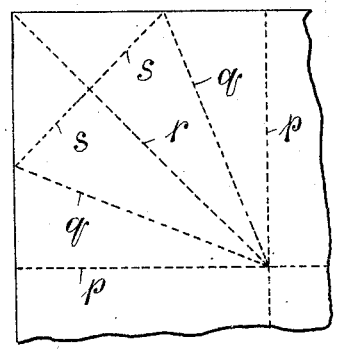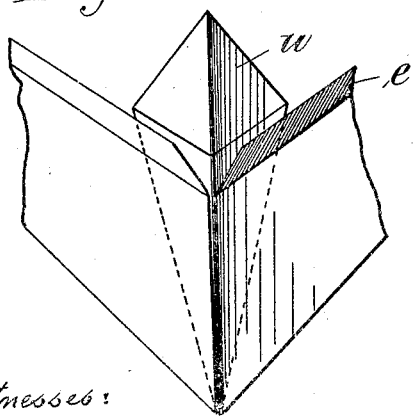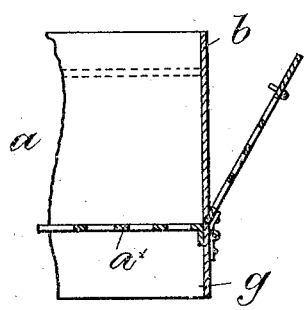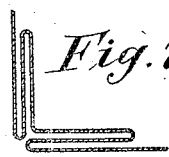

UNITED STATES PATENT OFFICE.

GEORGE FREDERICK HUMPHREY AND HARRY MERRIN, OF LONDON, ENGLAND.

COOKING UTENSIL.

1,056,547. Specification of Letters Patent. Patented Mar. 18, 1913.

Application filed December 28, 1911. Serial No. 668,312.

*To all whom it may concern:*

Be it known that we, GEORGE FREDERICK HUMPHREY and HARRY MERRIN, subjects of the King of Great Britain, residing at London, England, have invented certain new and useful Improvements in Cooking Utensils, of which the following is a specification.

This invention relates to improvements in utensils used in connection with the method of cooking food wherein the food is inclosed in paper inclosures.

It pertains particularly to cooking utensils in which an impervious paper receptacle is employed of such a nature as to retain the juice, or other liquid, or vapor within same and said paper receptacle fits and is properly supported by the sides and bottom of the casing. In this method of cooking when bags of former constructions are used, considerable difficulty is frequently encountered in inserting certain kinds of food into the bags and in ultimately removing the cooked food from the bags, as the latter are apt to become carbonized and thereby to adhere to the food and to break. Some forms of bags are also difficult to grease.

The object of the present invention is to avoid the difficulties above mentioned and generally to render cooking by means of paper inclosures much easier, and more efficient than hitherto.

The invention consists in a cooking utensil comprising an openwork casing, a paper lining, and means for securing the lining so as to form a complete and impervious paper inclosure.

The invention also comprises various details hereinafter referred to.

Figure 1:
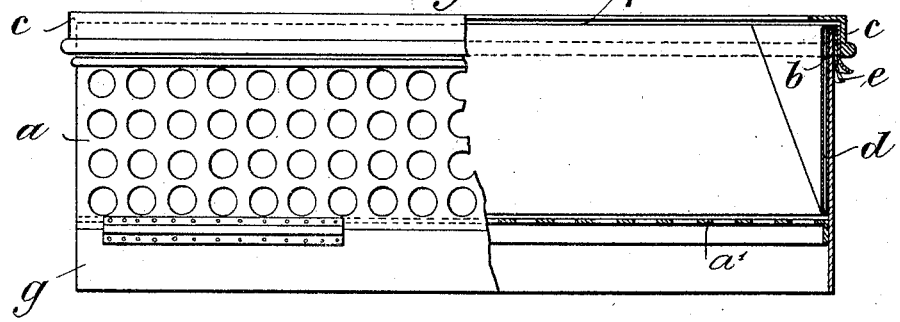
Figure 3:
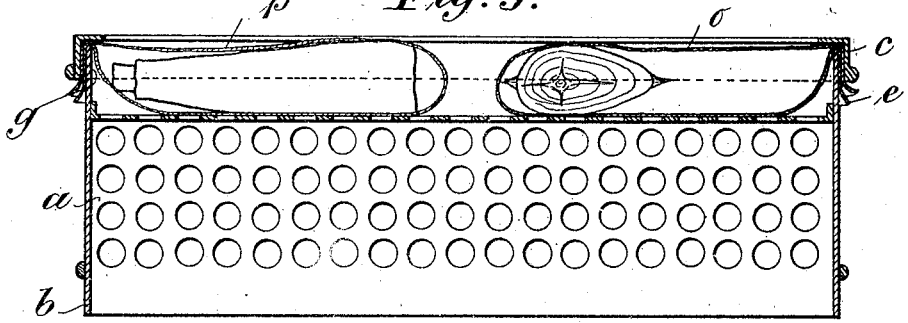
Figure 4:
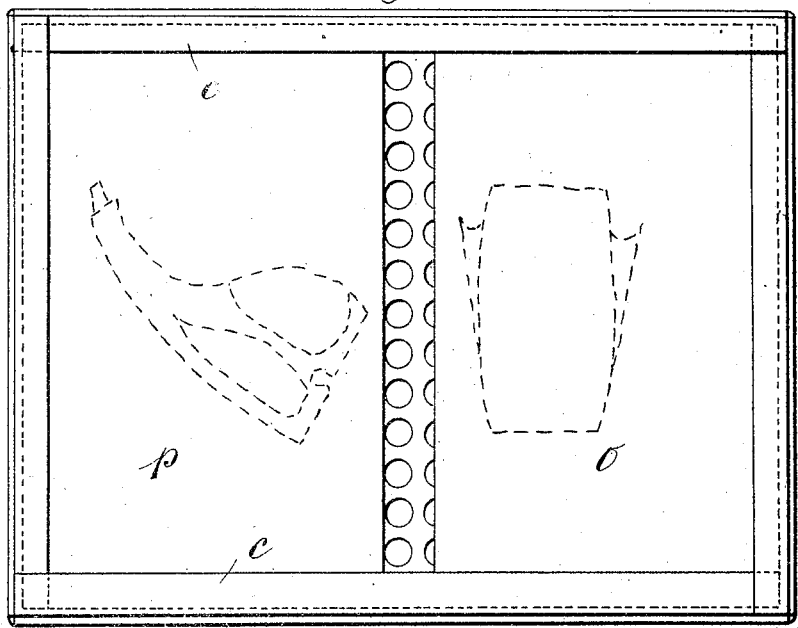

In the accompanying drawings:—Figure 1, is an elevation half in section, showing one form of casing and paper lining. Fig. 2, is a detail view showing a hinged side. Figs. 3 and 4, are respectively a sectional elevation and a plan showing two pieces of folded paper secured to the casing. Figs. 5 to 9, illustrate successive steps adopted in one mode of folding the paper lining.

In carrying out the invention according to one mode, a rectangular or other suitably shaped casing $a$, of perforated metal is formed with a raised edge or rim $b$, around its open top. Within the casing there is mounted a perforated bottom or partition $a^1$ which is located intermediate of the upper and lower edges of the same. A frame $c$, of sheet metal, angle iron, or thick iron wire is made to fit the rim fairly tightly.

When the utensil is to be used, a paper lining $d$, is placed within the casing $a$, so as to fit it approximately and form a paper receptacle. The lining $d$, can be conveniently folded from a sheet of suitably prepared paper, such as is used in the method of cooking referred to. The lining or receptacle $d$, is made large enough to leave a margin $e$, extending beyond the rim $b$, of the casing $a$, and this margin is folded down outside the rim. The food to be cooked is then placed in the paper lining or receptacle $d$. A sheet of paper $f$, is next placed over the rim, $b$, so as to form a lid or closure for the paper lining or receptacle $d$, containing the food, this sheet $f$, extending beyond the rim $b$, all around. The sheet metal frame $c$, is then forced on to the rim $b$, so as to clip the paper firmly to the rim. A complete and practically air tight paper closure $d$, $f$, is thereby obtained. When the cooking is completed, the utensil is removed from the oven, the clipping frame $c$, and paper top $f$, are taken off and the food can be handled as easily as if it were in an ordinary dish, the paper lined casing $a$, $d$, acting as a dish.

If desired, the paper $d$, can be broken so as to allow the gravy or liquor to escape into a dish on which the casing may be placed when cooking is completed.

Should it be desired with certain classes of food, to effect a "browning" of the food, the clipping frame $c$, can be slipped off before the utensil is removed from the oven.

When a shallow utensil is required the clipping frame can be placed on the lower extensions $g$, the casing $a$, being inverted. For small articles of food, such as an egg, rasher of bacon, or the like, the food can be inserted in a simply folded sheet of paper which can be placed over the casing and then clipped by the frame as indicated at $o$, and $p$, Figs. 3 and 4, this arrangement permitting of two different articles of food being cooked at the same time.

A convenient mode of folding the paper lining $d$, is illustrated by Figs. 5 to 9. The sheet of paper is first creased along the lines $p$, to suit the depth of the casing. It is then creased at each corner along the lines $q$, $r$, $s$. The side portions are then folded or bent up about the lines $p$, and each corner is folded as indicated in perspective in Fig. 6. The folding is further continued until the lines $q$, lie in the respective side portions, this arrangement being indicated in plan in Fig. 7, and in perspective in Fig. 8. The lining is then placed in the casing the margins $e$, folded down and then each projecting corner piece $u$, is folded outside as indicated in perspective in Fig. 9. A practically liquid and air tight corner is thereby made.

We claim:—

1. A vessel having upstanding walls and a transverse foraminous diaphragm, in combination with a container of paper, impervious to fluids, directly supported by said diaphragm and walls, and means for pressing the marginal portions of the container firmly against said walls, hermetically closing the container.

2. A vessel having upstanding walls, a transverse foraminous diaphragm, and a ring or cover for the walls, in combination with an impervious paper receptacle having its marginal portions compressed between said walls and the ring or cover, hermetically closing the receptacle.

3. A vessel having upstanding walls and a transverse foraminous diaphragm unequally distant from its ends, in combination with a receptacle of paper, impervious to fluids, having its pressure-bearing parts directly supported by said diaphragm and walls, a similarly impervious cover, and means for holding the marginal portions of the cover and receptacle together against the marginal portion of the vessel's walls to form a hermetic closure.

4. The combination with a tubular vessel having foraminous lateral walls and a foraminous bottom unequally distant from its ends of a paper container empervious to fluids, forming a lining for the upper compartment and fully supported by said walls and bottom, a paper cover similarly impervious and having a peripheral flange portion in contact with the marginal portion of the container, and a clip for binding the flange and marginal portion of the container together against the wall of the vessel, to prevent the escape of fluids between the two.

In testimony whereof we have signed our names to this specification in the presence of two subscribing witnesses.

GEORGE FREDERICK HUMPHREY.
HARRY MERRIN.

Witnesses:
H. D. JAMESON,
O. J. WORTH.